United States Patent Office 2,785,172
Patented Mar. 12, 1957

2,785,172

DIALKYLAMINOALKYLPHENETIDINOPYRIDINE

Robert R. Burtner, Skokie, Ill., assignor, by mesne assignments, to G. D. Searle & Co., Skokie, Ill., a corporation of Delaware No Drawing. Application June 17, 1953,
Serial No. 362,425

11 Claims. (Cl. 260—296)

This invention relates to dialkylaminoalkylphenetidinopyridines and their acid addition salts, and to processes for the manufacture of these pyridines and their salts. In particular, this invention relates to pyridine derivatives of the formula

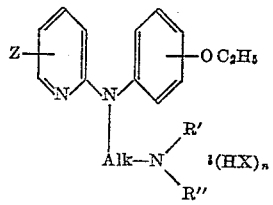

wherein Z is hydrogen or a methyl radical, Alk is a lower alkylene radical containing at least 2 and not more than 4 carbon atoms, NR'R" is either a lower dialkylamino radical or a nitrogen-containing heteromonocyclic radical, X is one equivalent of an anion, and $n$ is either 0 (when the compound is a tertiary base) or it is a positive integer amounting to less than 3.

In the foregoing structural formula, Alk represents a lower alkylene radical as remarked, said alkylene radical being defined as a bivalent, saturated, acyclic, straight- or branched-chain hydrocarbon radical of empirical formula $$C_nH_{2n}$$

wherein $n$ is a positive integer greater than 1 and less than 5. The alkylene radicals comprehended by Alk as hereinabove defined include, for example,

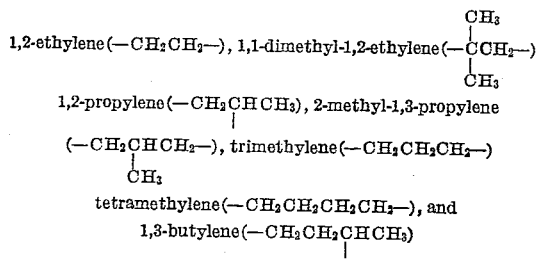

as well as such other lower alkylene radicals as fall within the purview of the aforesaid definition and terms.

The radicals R' and R" represent lower alkyl radicals such as methyl, ethyl, propyl, isopropyl, butyl, isobutyl, and secondary butyl; or, taken together with the attached nitrogen, they represent saturated, nitrogen-containing, heteromonocyclic radicals such as piperidino, morpholino, and pyrrolidino radicals. The substituent X represents one equivalent of such non-toxic anions as chloride, bromide, iodide, methyl sulfate, ethyl sulfate, benzene sulfonate, toluene sulfonate, tartrate, succinate, malate, acetate, citrate, nitrate, sulfate, phosphate, sulfamate, and the like.

The compounds of this invention are useful in medicine as diuretics. They have the property of augmenting both urine volume and sodium excretion, producing a significant loss of body weight and decreased dyspnea in cases of edema associated with congestive cardiac failure, renal disease, cirrhosis of the liver, and other common pathologic states. Unlike the mercurial and xanthine diuretics well known to the art, the compounds of the present invention are characterized by relatively low toxicity and a minimal incidence of side effects, a circumstance which correspondingly enhances their value in the restoration of normal renal function.

Moreover, the subject compounds show appreciable chemotherapeutic promise in the field of cardiac pathology. In particular, they are valuable because of their digitalis-like activity, showing marked capacity for myocardial stimulation in instances of insufficiency associated with the failing heart.

Still further, the compounds of this invention are useful as chemical intermediates: quaternary salts prepared from the tertiary bases herein disclosed are potent ganglion blockers, and the acid addition salts of this invention serve to purify and characterize the parent tertiary bases.

The amine bases which comprise this invention are relatively insoluble in water but may be dissolved in dilute acids and in most of the common organic solvents. The acid addition salts of this invention are, on the other hand, readily soluble in water and in aqueous solutions of alcohols or other water-miscible organic solvents. The subject compounds may be administered in solid form as tablets or capsules; dissolved in aqueous media, they may be given parenterally.

The compounds to which this invention relates are conveniently prepared according to the following procedure: An α-halogenated pyridine or picoline, for example 2-bromo-4-methylpyridine, is reacted with a phenetidine, for example p-phenetidine, in the presence of a condensing agent such as potassium carbonate or, preferably, copper powder, to form an α-phenetidino-pyridine or -picoline. The condensation is ordinarily carried out at elevated temperatures (120 to 175° centigrade) and reduced pressures (25 to 60 millimeters of mercury) over periods of time ranging upward from one hour. One suitable combination of temperature, pressure, and time is 140–150° centigrade at 40 millimeters' pressure for 6 hours. The phenetidinopyridine is, in turn, reacted successively with a condensing agent, such as sodamide, and a dialkylaminoalkyl halide, for example diethylaminoethyl chloride, to produce the corresponding N-dialkylaminoalkylphenetidino compound. Various inert, non-polar, organic liquids will serve as reaction media, toluene having been found a solvent of choice when sodamide is the condensing agent. With potassium carbonate, methyl ethyl ketone may be used. The reaction is commonly run at temperatures of 90° to 110° centigrade and completed after approximately 20 hours. Temperatures of the order of 20° higher or lower may also be used, and the reaction time may vary from 10 to as long as 36 hours. An inert atmosphere, such as a nitrogen atmosphere, is ordinarily maintained throughout the course of the reaction, though this may be dispensed with after the first two or three hours. The N-dialkylaminoalkylphenetidinopyridine thus formed, the formula of which is

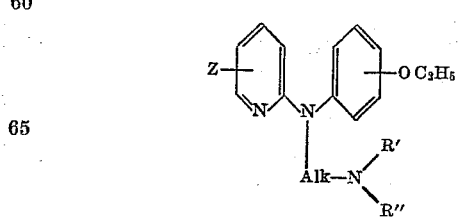

where Z, Alk, R', and R" have the meanings hereinbefore defined, is then converted to the acid addition salt by simple admixture with one or two equivalents of any of various inorganic and strong organic acids, the anionic portion of which conforms to the definition of X as set forth above.

The following examples will illustrate in detail certain of the pyridine derivatives which constitute the present invention and methods which have been devised for their preparation. However, the invention is not to be construed as limited thereby either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.), pressures in millimeters (mm.) of mercury, and relative amounts of materials in parts by weight, except as otherwise noted.

*Example 1*

A. *4-methyl-2-(p-phenetidino)-pyridine.*—A mixture of 237 parts of 2-bromo-4-methylpyridine, 192 parts of p-phenetidine, and 7 parts of copper powder is heated in a jacketed vessel at 140–150° C. (jacket temperature) and an absolute pressure of 40 mm. of mercury for six hours. The mixture, which refluxes gently during the first hour, gradually becomes more viscous and ceases to reflux as the reaction progresses. An excess of hot 10% aqueous muriatic acid is added, whereupon the copper is filtered out and the reactants then made alkaline with an excess of 25% aqueous caustic soda. The base, thus precipitated as an oil, is induced to crystallize on cooling. The product is filtered out, ground and washed with water, and finally dried to give a tan solid melting at 97–98° C. Recrystallization from 5 volumes of methyl alcohol yields buff colored crystals, M. P. 101–102° C.

B. *2-(N-diethylaminoethyl-p-phenetidino)-4-methylpyridine.*—To a stirred suspension of 29 parts of sodamide in 2150 parts of dry toluene at 90–100° C. under an atmosphere of nitrogen is added 170 parts of 4-methyl-2-(p-phenetidino)-pyridine. The reactants are refluxed and stirred for approximately 3 hours, at the end of which time heating is discontinued and 100 parts of diethylaminoethyl chloride is slowly added. An exothermic reaction ensues, following which heat is again applied and reflux continued for 15 hours. Approximately 2500 parts of water is then added, whereupon the toluene layer is, successively, separated, washed with water, and subjected to vacuum distillation to remove the solvent. The dark, viscous oil which remains is the desired product.

C. *2-(N-diethylaminoethyl-p-phenetidino)-4-methylpyridine dihydrochloride.*—The teritary base of the preceding part B is converted to the hydrochloric acid salt by dissolution in anhydrous ether and treatment of this solution with 2 molecular equivalents of absolute alcoholic hydrogen chloride. The salt is isolated by decanting the supernatant ether-alcohol layer, taking up the residue in 1750 parts of boiling methyl ethyl ketone, and then allowing to cool and stand at room temperature. The dihydrochloride comes out as nearly colorless crystals which, recovered on a filter and dried at 75° C., melt at 201–203° C. The salt is quite soluble in water; it has the formula

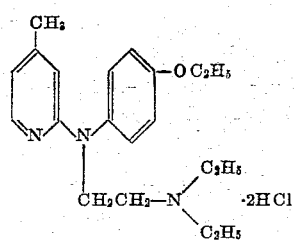

*Example 2*

A. *6-methyl-2-(p-phenetidino)-pyridine.*—A mixture of 516 parts of 2-bromo-6-methylpyridine, 411 parts of p-phenetidine, and 10 parts of copper powder is heated in a jacketed vessel at 140–150° C. (jacket temperature) and an absolute pressure of 40 mm. of mercury for 6 hours according to the technique of Example 1A. The reaction mixture is then acidified with approximately 10,000 parts of hot 10% aqueous muriatic acid, filtered, and made alkaline with an excess of 25% aqueous caustic soda, in that order. The base so precipitated granulates on standing, and is, successively, ground and washed with water, dried, and finally recrystallized from 6 volumes of cyclohexane to give tan needles, M. P. 91–92° C.

B. *2-(N-diethylaminoethyl-p-phenetidino)-6-methylpyridine.*—Using essentially the procedure of Example 1B, 229 parts of 6-methyl-2-(p-phenetidino)-pyridine, 39 part of sodamide, and 135 parts of diethylaminoethyl chloride in 2600 parts of toluene are reacted at reflux temperatures for 20 hours to give, in good yield, the desired 2-(N-diethylaminoethyl-p-phenetidino)-6-methylpyridine as an oil.

C. *2-(N-diethylaminoethyl-p-phenetidino)-6-methylpyridine dihydrochloride.*—The base of the preceding part B may be converted to the dihydrochloride by reaction in anhydrous ether solution with 2 molecular equivalents of absolute alcoholic hydrogen chloride. The salt comes down as a viscous oil which granulates on standing. Recrystallization from 10 volumes of a mixture consisting of 11 parts of isoproply alcohol and 50 parts of ethyl acetate gives, on treatment with decolorizing charcoal, colorless crystals, M. P. approximately 154° C. The product, readily soluble in water, has the formula

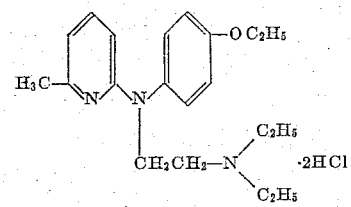

*Example 3*

A. *6-methyl-2-(m-phenetidino)-pyridine.*—A mixture of 344 parts of 2-bromo-6-methylpridine, 274 parts of m-phenetidine, and 10 parts of copper powder is heated at 140–150° C. (jacket temperature) under an absolute pressure of 40 mm. of mercury for 6 hours in accordance with the procedure of Example 1A. Successive acidification, filtration, alkalization, and extraction with ether, followed by stripping of the solvent and distillation in vacuo, yields the desired base as a yellow oil, B. P. 145–147° C. at 0.3 mm. pressure. The monohydrochloride may be prepared from the base by treatment of an anhydrous ether solution thereof with one molecular equivalent of absolute alcoholic hydrogen chloride. The salt so prepared shows M. P. 114–115° C.

B. *2-(N-diethylaminoethyl-m-phenetidino)-6-methylpyridine.*—Interaction of 228 parts of 6-methyl-2-m-phenetidinopyridine, 39 parts of sodamide, and 135 parts of diethylaminoethyl chloride, using 2600 parts of toluene as the solvent and following the procedure described in Example 1B, affords a good yield of 2-(N-diethylaminoethyl-m-phenetidino)-6-methylpyridine.

C. *2-(N-diethylaminoethyl-m-phenetidino)-6-methylpyridine dihydrochloride.*—The tertiary base of the preceding part 3B, treated in anhydrous ether solution with 2 molecular equivalents of absolute alcoholic hydrogen chloride, gives the dihydrochloride as a brown solid. Purification is achieved by crystallization from 13 volumes of a mixture consisting of 8 parts of isopropyl alcohol and 36 parts of ethyl acetate. The desired 2-(N-diethylamino-ethyl-m-phenetidino)-6-methylpyridine dihydrochloride is thus obtained as colorless crystals, M. P. 169–

170° C. The product is readily soluble in water and has the formula

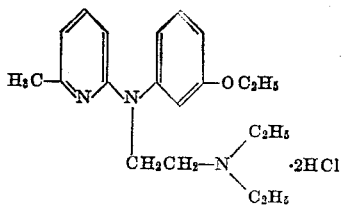

Example 4

A. *2-(p-phenetidino)-pyridine.*—A mixture of 158 parts of 2-bromopyridine, 137 parts of p-phenetidine, and 6 parts of copper powder is heated at 140–150° C. (jacket temperature) under an absolute pressure of 40 mm. of mercury for 6 hours, at the end of which time sufficient hot 10% aqueous muriatic acid is introduced to render the reaction mixture acid, whereupon the copper catalyst is filtered out. The filtrate is made alkaline with 25% aqueous caustic soda; and the base, which is precipitated as an oil, is then extracted into ether. Stripping of the solvent, followed by vacuum distillation, yields the desired 2-(p-phenetidino)-pyridine as a white solid, M. P. approximately 92° C.

B. *2 - (N - diethylaminoethyl - p - phenetidino) - pyridine.*—By reaction of 214 parts of the base of the preceding Part 4A, 39 parts of sodamide, and 135 parts of diethylaminoethyl chloride, using 2600 parts of toluene as the solvent and following the procedure of Example 1B, a good yield of 2-(N-diethylaminoethyl-p-phenetidino)-pyridine is obtained as an oil.

C. *2 - (N - diethylaminoethyl - p - phenetidino) - pyridine dihydrochloride.*—Preparation of the dihydro chloride may be accomplished in conventional fashion by treatment of the tertiary base of the preceding part B with 2 molecular equivalents of absolute alcoholic hydrogen chloride solution. The dihydrochloride is crystallized from 10 volumes of a mixture consisting of 47 parts of isopropyl alcohol and 216 parts of ethyl acetate. It melts at 158–159° C. and has the formula

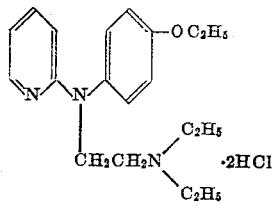

Example 5

A. *6 - methyl - 2 - (N - methylanilino) - pyridine.*—Interaction of 63 parts of 2-bromo-6-methylpyridine, 39 parts of N-methylaniline, and 1 part of copper powder at 140–160° C. (jacket temperature) under 40 mm. of mercury absolute pressure for 6 hours, according to the procedure detailed in Example 4A, gives 6-methyl-2-(N-methylanilino)-pyridine as a pale yellow oil, B. P. 95–100° C. at 0.15–0.2 mm. pressure.

B. *6-(γ-diethylaminopropyl) - 2 - (N - methylanilino)- pyridine.*—To a stirred ether solution of phenyl lithium—prepared in the customary manner from 39 parts of bromobenzene and 3.5 parts of lithium—is added, over a 15 minute period, 49 parts of the tertiary base of the preceding part A. A mildly exothermic reaction ensues, causing gentle reflux, following which the reactants are stirred at room temperature for 2 hours longer. Approximately 34 parts of diethylaminoethyl chloride is then added over a 20 minute period. A vigorous reaction takes place, which, however, soon subsides. The reaction mixture is heated to reflux temperature and maintained thereat with stirring for 7 hours, whereupon 500 parts of water is cautiously added. The ethereal phase of the resultant mixture is separated and washed with water. Solvent is then stripped off and the residual material is distilled in vacuo, yielding the desired 6-(γ-diethylaminopropyl)-2-(N-methylanilino)-pyridine as a yellow oil, B. P. 143–147° C. at 0.25 mm. pressure.

C. *6-(γ-diethylaminopropyl) - 2 - (N - methylanilino)- pyridine dihydrochloride.*—Conversion of the base of the foregoing part B to the desired hydrochloric acid addition salt is accomplished in the usual fashion by treatment in ether solution with 2 molecular equivalents of absolute alcoholic hydrogen chloride. Crystallization of the dihydrochloride thus obtained from 7 volumes of a mixture of 2 parts of isopropyl alcohol and 9 parts of ethyl acetate gives white crystals too hygroscopic to afford satisfactory melting point data. The product is readily soluble in water. It has the formula

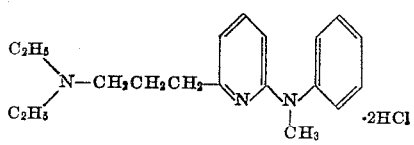

Example 6

A. *5-amino-2-anilinopyridine.*—A solution of 10 parts of 2-anilino-5-nitropyridine—prepared according to the procedure of A. Mangini, "Chemical Abstracts," 33 9305 (1939)—and 48 parts of stannous chloride dihydrate in 67 parts of muriatic acid and 225 parts of water is heated at reflux temperatures for 5 hours. The reaction mixture is then concentrated to approximately one-fourth its original volume. Upon chilling, the tan colored tin complex is precipitated. Trituration of the complex with 200 parts of 10% aqueous caustic soda gives the crude amine as a purple solid. Purification is achieved by recrystallization from 8 volumes of toluene, using decolorizing charcoal in process. The magenta-colored 5-amino-2-anilinopyridine thus obtained shows M. P. approximately 137° C.

B. *2 - anilino-5-(β-chloropropionamido)-pyridine.*—To a stirred, refluxing suspension of 32 parts of potassium carbonate and 43 parts of 5-amino-2-anilinopyridine in 1000 parts of dioxane is cautiously added 30 parts of β-chloropropionyl chloride. The resultant vigorous reaction is accompanied by copious evolution of carbon dioxide. When the addition is complete, the reactants are maintained for 45 minutes longer at reflux temperature, whereupon the mixture is filtered hot and the filtrate subjected to vacuum distillation to remove solvent. The residue is suspended in 2500 parts of water containing 10 parts of caustic soda. The crude amide is filtered therefrom, then rinsed with water, and finally dried at room temperature. It may be used in the succeeding preparation of 2-anilino - 5 - (β-piperidylpropionamido)- pyridine without further purification.

C. *2 - anilino-5-(β-piperidylpropionamido)-pyridine.*—A mixture of 58 parts of the crude amide of the preceding part B and 430 parts of piperidine is heated at reflux temperatures for 9 hours. Excess piperidine is then removed by vacuum distillation and the residue is dissolved in excess 10% aqueous muriatic acid. Alkalization with 25% aqueous caustic soda causes precipitation of the desired base, which, dried and then crystallized from 13 volumes of benzene, using decolorizing charcoal in process, shows M. P. approximately 158° C. 2-anilino-5-(β-piperidylpropionamido)-pyridine is thus obtained as white crystals, readily soluble in dilute muriatic acid, having the formula

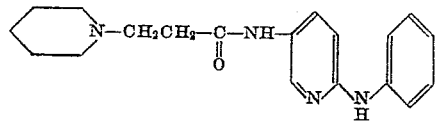

I claim:
1. A compound selected from the group consisting of amines and acid addition salts thereof, said amines having the formula

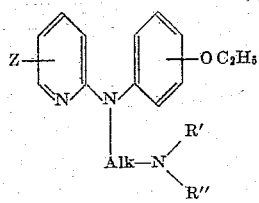

wherein Z is a member of the group consisting of hydrogen and a methyl radical; Alk is a lower alkylene radical containing at least 2 and not more than 4 carbon atoms; and NR'R" is a member of the group consisting of lower dialkylamino, pyrrolidino, morpholino, and piperidino radicals.

2. An acid addition salt of a compound having the formula

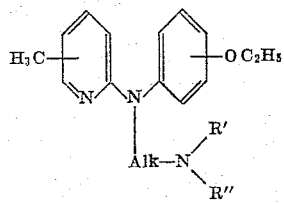

wherein Alk is a lower alkylene radical containing at least 2 and not more than 4 carbon atoms, and R' and R" are lower alkyl radicals.

3. An acid addition salt of an N-dialkylamino-ethyl-phenetidinopicoline having the formula

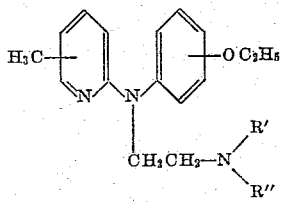

wherein R' and R" are lower alkyl radicals.

4. An N-diethylaminoethylphenetidinopicoline dihydrohalide having the formula

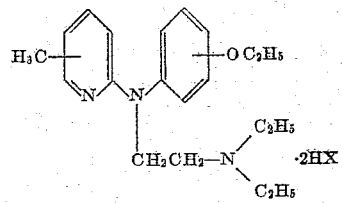

wherein X is halogen.

5. 2 - (N-diethylaminoethyl-p-phenetidino) - 4 - methyl-pyridine dihydrochloride.

6. 2 - (N-diethylaminoethyl-p-phenetidino) - 6 - methyl-pyridine dihydrochloride.

7. 2 - (N-diethylaminoethyl-m-phenetidino) - 6 - methyl-pyridine dihydrochloride.

8. An acid addition salt of a compound having the formula

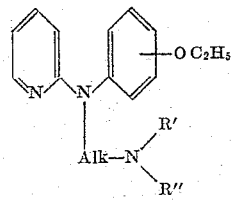

wherein Alk is a lower alkylene radical containing at least 2 and not more than 4 carbon atoms, and R' and R" are lower alkyl radicals.

9. An acid addition salt of an N-dialkylaminoethyl-phenetidinopyridine having the formula

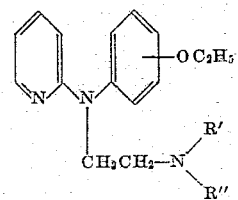

wherein R' and R" are lower alkyl radicals.

10. An N-diethylaminoethylphenetidinopyridine dihydrohalide having the formula

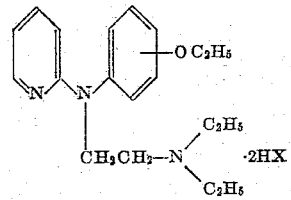

wherein X is halogen.

11. 2-(N-diethylaminoethyl-p-phenetidino)-pyridine dihydrochloride.

References Cited in the file of this patent

UNITED STATES PATENTS

| 2,406,594 | Djerassi et al. | Aug. 27, 1946 |
| 2,502,151 | Horclois | Mar. 28, 1950 |

FOREIGN PATENTS

| 170,862 | Austria | Apr. 10, 1952 |
| 606,187 | Great Britain | Aug. 10, 1948 |

OTHER REFERENCES

Idson: Chem. Reviews, vol. 47, pp. 462–66 (1950).